2,818,432

PRODUCTION OF 2,2'-DIHYDROXY-1,1'-ALDAZINES OF THE BENZENE AND NAPHTHALENE SERIES

Ben H. Kirby, Jr., Pittsburgh, Pa., assignor to General Aniline & Film Corporation, New York, N. Y., a corporation of Delaware No Drawing. Application December 1, 1954
Serial No. 472,504

3 Claims. (Cl. 260—566)

This invention relates to a new process for the production of 2,2'-dihydroxy-1,1'-aldazines of the benzene and naphthalene series, and sulfonated derivatives thereof.

Aldazines of the aforementioned type are well known as colored dyestuffs which fluoresce under the influence of ultra-violet light, often in the same wave length as the subtractive daylight color. As such, they find many uses in industry such as in printing inks, stains, paints, lacquers, varnishes and other coating compositions, rubber, plastics, wax compositions such as colored crayons, paper impregnation, and similar compositions.

The conventional method for preparing these compounds involves condensing a methanol or ethanol solution of the 2-hydroxy-1-benzaldehyde or -naphthaldehyde at preferably reflux temperatures with hydrazine usually in the form of its sulfate. The precipitated products are then isolated by filtering, washing with alcohol, drying and grinding. This procedure is disadvantageous in several respects, among which is the necessity for supplying large amounts of heat to keep the hydrazine sulfate in solution and for employing special explosion-proof and solvent-recovery equipment. Further, the yields of 85 to 90% of theory thus obtained, and the quality of the products are not as high as could be desired.

It is an object of this invention to provide a process for producing 2,2'-dihydroxy-1,1'-aldazines of the benzene and naphthalene series which would avoid the above-mentioned difficulties. Another object of this invention is the production of such compounds in higher yields. Still another object of this invention is the production of products of the above type having improved properties with respect to brightness, fluorescence and/or application strength. Other objects and advantages will appear as the description proceeds.

The attainment of the above objects is made possible by the instant invention which comprises condensing a 2-hydroxy-1-aldehyde of the formula

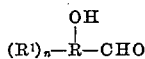

wherein R is selected from the group consisting of benzene and naphthalene, $R^1$ is selected from the group consisting of alkyl, alkoxy, halogen, nitro, hydroxy and amino, $n$ has a value of 0 to 3, and the OH group bonded to R is in ortho position relative to the aldehyde group, in sulfuric acid having a concentration of at least 65% by weight with a compound selected from the group consisting of hydrazine and its hydrate and salts. In addition to eliminating the necessity for operating at high or reflux temperatures, with use of explosion-proof equipment and solvent recovery equipment, it has been found that the process of this invention in most instances produces yields of the desired product in the range of 95 to 100% of theory. Still more surprising, it has been found that the products of this process are generally much brighter, have considerably more fluorescence under the influence of ultra-violet light, and/or have application strengths of up to 50 to 70% more than the products produced by the prior art process. The operativeness of the process described above is most unexpected in view of the well known instability of compounds containing the group —CH=N— in sulfuric acid. It will be understood that as employed above, the term "sulfuric acid having a concentration of at least 65%" is inclusive of oleums having free $SO_3$ contents of up to 20% or more.

The condensation may be carried out at temperatures ranging from about 10 to 60° C. depending upon the concentration of the sulfuric acid and type of product desired. Thus, when employing concentrations of sulfuric acid in the range of about 65 to 86% by weight, temperatures of about 10 to 35° C. may be employed. In this embodiment, concentrations of about 76 to 80% are preferred. As another embodiment of this invention, it has been found that when concentrations of sulfuric acid of about 87% or more, including up to about 20% oleum or more, are employed in conjunction with temperatures of about 25 to 60° C., the resulting aldazines are produced in sulfonated form. These sulfonated products, which are for the most part monosulfonated in the aromatic residue R, with or without some disulfonated products, are water soluble and can be isolated by normal salting out procedures. As such, they can be employed to dye wool and other animal fibers in addition to nylon using normal acid dyeing procedures. As a further feature of this invention, it has been found that the metal, particularly chromium, complexes of these sulfonated 2,2'-dihydroxy-1,1'-aldazines, formed by metallizing in bulk, on a substratum or preferably on the fiber, constitute novel dyestuffs yielding improved dyeings. Such metal complexes are probably chelates, and contain the usual proportions of from less than about ½ to 1 or more atoms of metal for each molecule of sulfonated 2,2'-dihydroxy-1,1'-aldazine. In either of the embodiments described above, a sufficient amount of sulfuric acid, generally at least 5 parts by weight per part of the aldehyde, should be employed to yield a stirrable mass.

In the formula given above for the 2-hydroxy-1-aldehyde to be employed in the instant invention, $R^1$ may for example be methyl, ethyl, propyl, butyl, chloro, bromo, nitro, hydroxy, amino, methoxy, ethoxy, butoxy or the like. Where $n$ has a value of more than 1, it will be understood that $R^1$ may be the same or different. In general, theoretical considerations require the use of about 2 moles of the 2-hydroxy-1-aldehyde for each mole of hydrazine compound, but these proportions may be varied if desired. Thus, an excess of one reactant in some instances hastens completion of the reaction.

The hydrazine reactant is preferably hydrazine sulfate, but other hydrazine compounds may be employed such as hydrazine, hydrazine hydrate, hydrazine chloride, hydrazine nitrate or the like. However, the sulfate has been found to produce the best results with respect to yield and the like.

The products produced by the process of this invention correspond to compounds having the formula

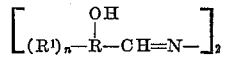

and their sulfonated and metallized derivatives, R, $R^1$ and $n$ having the values given above.

The condensation is usually complete in about 1 to 5 hours after which the reaction mixture is drowned in water. Usually, at least about 8 parts of water by weight per part of sulfuric acid is sufficient. As a still further feature of this invention, it has been found that products having improved pigmentary properties with respect to softness, particle size, particle size distribution and particle surface characteristics are obtained when the precipitated 2,2'-dihydroxy-1,1'-aldazine in the drowned reaction mixture is treated with a conditioning agent selected from the group consisting of a 1-hydroxy-ethyl glyoxalidine containing a long chain hydrocarbon in the 2-position, and an N-higher acyl taurine. Since these conditioning agents yield highly satisfactory results when used in acid solution, they may be added directly to the drowned reaction mixture. However, if desired, the precipitated 2,2′-dihydroxy-1,1′-aldazine in the drowned reaction mixture may be filtered, the presscake slurried in water, and the conditioning agent added to the slurry. About 0.5 to 20% of the conditioning agent by weight of the aldazine product represents a preferred range of proportions. Smaller amounts are usually ineffective, and larger amounts usually result in lower application strengths, etc.

Effective glyoxalidines useful as conditioning agents in this invention are as stated water dispersible 1-hydroxy ethyl glyoxalidines containing a long chain hydrocarbon radical in the 2-position, these being at present commercially available. The length of the hydrocarbon radical may be varied from about 8 to 18 carbon atoms and may contain unsaturated linkages. Because of ready availability, the preferred compound for use herein is 1-hydroxy-ethyl-2-heptadecenyl glyoxalidine. Others, however, are equally effective such as the corresponding 2-octyl and octadecyl glyoxalidines.

The N-higher acyl taurine compounds useful as conditioning agents in the instant invention are well known and correspond to compounds having the formula

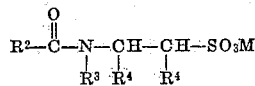

wherein $R^2$ is an aliphatic or alicyclic hydrocarbon radical of at least 8 carbon atoms, $R^3$ is selected from the group consisting of H and hydrocarbon radicals of 1 to 6 carbon atoms, $R^4$ is selected from the group consisting of hydrogen and lower alkyl, and M is a cation selected from the group consisting of H, alkali metals and alkaline earth metals.

The preferred taurine compound is sodium-N-methyl-N-oleoyl-tauride. However, other taurine compounds answering to the above formula are well known in the art and may also be employed. In general, by way of example $R^2$ may be derived from caprylic acid, pelargonic acid, capric acid, lauric acid, myristic acid, palmitic acid, stearic acid, oleic acid, ricinoleic acid, linoleic acid, talloil acids, acid mixtures derived from various natural plant and animal oils, naphthenic acid, abietic acid, and hydrogenated and dehydrogenated derivatives of such acids; $R^3$ may represent methyl, ethyl, isopropyl, butyl, cyclohexyl, phenyl or the like; $R^4$ may represent hydrogen, methyl, ethyl, isopropyl or the like, and M may represent sodium, potassium, lithium, calcium, magnesium, barium, or the like or ammonium or an amine. Among these substituents, those preferred are compounds wherein $R^2$ is a long chain aliphatic hydrocarbon such as derived from palmitic, lauric, oleic or stearic acid, $R^3$ is methyl or cyclohexyl, $R^4$ is hydrogen, and M is an alkali metal such as sodium or potassium. In addition to the sodium-N-methyl-N-oleoyl tauride mentioned above, other preferred taurine compounds include sodium-N-methyl-N-palmitoyl tauride, sodium-N-cyclohexyl-N-palmitoyl tauride, sodium - N - cyclohexyl - N - stearoyl tauride and the like. Following treatment with the conditioning agent, the product is isolated in known manner by filtering, washing neutral, drying and grinding.

The following examples, in which parts are by weight unless otherwise indicated, are illustrative of preferred embodiments of this invention and are not to be regarded as limitative.

*Example 1*

17.2 parts of 2-hydroxyl-1-naphthaldehyde and 7.15 parts of hydrazine sulfate are mixed together and charged over one hour into 225 parts of sulfuric acid (78% by weight) at 25° C. with constant agitation.

A bright red condensation product is formed instantaneously, and after 3 hours the mass becomes somewhat thicker. At this point, the reaction mass shows uniform red needles under the microscope.

The reaction mixture is slowly drowned into 2400 parts of water at 60° C. and the desired bis-2-hydroxy-1-naphthaldazine is precipitated in the form of orange-colored needles.

Now at 60° C., there is added with constant stirring 2 parts of 1-hydroxyethyl-2-heptadecenyl glyoxalidine. In about 10 minutes, the orange-colored needles change rapidly to a bright yellow color which increases in brilliance with further agitation at 60° C. After 4 hours no further change takes place and the product is filtered, washed neutral with warm (60° C.) water and dried at 85° C. in an air dryer. The product, which is isolated in substantially quantitative yields is ground in a hammermill.

In various applications, e. g., drawdowns in beetle resin oil, it shows a bright greenish-yellow color which has 50-70% more pigmentary strength, is much brighter and has considerably more fluorescence under ultraviolet light than corresponding samples prepared by conventional procedures.

*Example 2*

17.2 parts of 2-hydroxy-1-naphthaldehyde and 7.15 parts of hydrazine sulfate are reacted in 225 parts of sulfuric acid (78%) as described in Example 1. After drowning in 2400 parts of water, 2 parts of sodium N-oleolyl-N-methyl tauride are added at 60° C. and agitated for 6 hours at this temperature. The product is isolated in substantially quantitative yields and has properties similar to those of the product of Example 1.

*Example 3*

17.2 parts of 2-hydroxy-1-naphthaldehyde and 7.15 parts of hydrazine sulfate are reacted together in 225 parts sulfuric acid (78%) as described in Example 1. The reaction mass is drowned into 600 parts of water and treated at 60° C. with 2 parts of 1-hydroxyethyl-2-heptadecenyl glyoxalidine. After 4 hours at 60° C., the product is isolated in substantially quantitative yields, and has properties similar to those of the product of Example 1.

*Example 4*

17.2 parts of 2-hydroxy-1-naphthaldehyde, 7.15 parts of hydrazine sulfate and 225 parts of sulfuric acid (78%) are reacted together and drowned into 2400 parts of water as in Example #1.

The product is then filtered off and washed acid free with warm water. The filter cake is slurried in 600 parts of fresh water and 2 parts of 1-hydroxyethyl-2-heptadecenyl glyoxalidine is added at 60° C. After 4 hours at 60° C., the product is isolated and has properties similar to those of the product of Example 1.

*Example 5*

Into a suitable flask with stirrer, thermometer, and dropping funnel, there is placed 225 parts of sulfuric acid (78%) and 7.15 parts of hydrazine sulfate. Now over 1 hour at 25-30° C., 12.2 parts of salicylaldehyde are added. The yellowish colored solution is stirred at 25-30° C. for 3 hours, drowned into 2400 parts of water at 60° C., and 2 parts of 1-hydroxyethyl-2-heptadecenyl glyoxalidine are added. Over a period of 4 hours, the light yellow-colored crystals change to a light orange color. At this point the product is filtered off, washed neutral and dried. The yield of bis-2-hydroxy-1-benzaldazine is substantially quantitative.

In application, as described in Example 1, this product has practically no color in ordinary daylight, but under the ultraviolet lamp it gives a bright yellow-orange fluorescence.

Example 6

Into a suitable flask with stirrer and thermometer is placed 225 parts of sulfuric acid (100%). Now with stirring there is charged over one hour at 25–30° C. a mix of 17.2 parts of 2-hydroxy-1-naphthaldehyde and 7.15 parts of hydrazine sulfate. After three hours at 25–30° C. the mix has a reddish-green fluorescence. A drop of the reaction melt is completely soluble in water which has enough sodium hydroxide to completely neutralize the acid. The reaction mass is now drowned into 1080 parts of water held below 30° C. and containing 120 parts of sodium chloride. The bright colored orange precipitate which forms is filtered off and washed neutral with 10% salt solution. The filter cake is slurried with enough water to give a smooth paste, and the pH adjusted to 8.0 to 9.0 by the addition of 50% sodium hydroxide solution. The product, which is now bright yellow in appearance, is dried in a hot air dryer in yields of 31–33 parts.

After grinding, this sulfonated product may be used to dye wool and nylon in bright yellow shades that have an intense greenish-yellow fluorescence under the influence of ultraviolet light.

The product may also be applied to wool and nylon using normal top-chrom and after-chrom techniques. In these cases, the cloth is dyed in yellow-brown shades which have a bronze colored appearance.

Example 7

17.2 parts of 2-hydroxy-1-naphthaldehyde and 7.15 parts of hydrazine sulfate are charged over 1 hour into 225 parts of sulfuric acid containing 5% $SO_3$ at 20–25° C. After all has been charged, the mixture is heated to 50–55° C. for 3 hours, drowned and worked up as in Example 6.

The bright yellow-colored sulfonated product is obtained in yields of 35–37 parts and has properties similar to those of the product of Example 6.

Example 8

Into a suitable flask is charged 225 parts of sulfuric acid (100%). Now there is added at 25–30° C., 7.10 parts hydrazine sulfate and over 1 hour 12.2 g. parts of salicylaldehyde. The reaction mixture is agitated at 30° C. for 3 hours and drowned into 766 parts of water containing 85 parts of sodium chloride.

The pink-colored product is filtered off, washed neutral with 10% salt solution and is neutralized and dried as above. The dried product is now pale yellow in appearance and is isolated in yields of 17–19 parts.

Using normal techniques, this sulfonated product dyes wool and nylon in pastel yellow shades, which under the influence of ultraviolet light, give a strong, bright, greenish-yellow fluorescence.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. A process comprising condensing at a temperature of about 10 to 60° C., 2 moles of an aldehyde of the formula

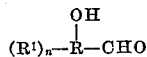

wherein R is selected from the group consisting of benzene and naphthalene, $R^1$ is selected from the group consisting of hydrogen, lower alkyl, lower alkoxy, halogen, nitro, hydroxy and amino, $n$ is an integer having a value of 1 to 3, and the OH group depicted in the formula as bonded to R is in ortho-position relative to the aldehyde group in a medium consisting of sulfuric acid having a concentration of about 65 to 86% by weight with 1 mole of a compound selected from the group consisting of hydrazine and its hydrate, sulfate, chloride and nitrate.

2. A process as defined in claim 1 wherein the aldehyde is 2-hydroxy-1-benzaldehyde and the said compound is hydrazine sulfate.

3. A process as defined in claim 1 wherein the aldehyde is 2-hydroxy-1-naphthaldehyde and the said compound is hydrazine sulfate.

References Cited in the file of this patent

UNITED STATES PATENTS

| | | |
|---|---|---|
| 483,290 | Roos | Sept. 27, 1892 |
| 2,305,379 | Detrick | Dec. 15, 1942 |
| 2,358,893 | Vincent | Sept. 26, 1944 |
| 2,440,070 | Blout et al. | Apr. 20, 1948 |
| 2,445,518 | Dreyfus | July 20, 1948 |
| 2,464,128 | Gearhart | Mar. 8, 1949 |
| 2,691,642 | Faulkner | Oct. 12, 1954 |

FOREIGN PATENTS

| | | |
|---|---|---|
| 92,470 | Germany | May 11, 1897 |

OTHER REFERENCES

Schapiro: "Ber. deut. Chem.," vol. 62 (1929), pp. 2133 to 2136.

Grammaticakis: "Comptes Rendus," vol. 226 (1948), pp. 189 to 191.

Chemical Abstracts, vol. 47 (1953), p. 6885. (Astract of J. Pharm. Soc., Japan, vol. 72 (1952), pp. 1162 to 1164.)